(12) United States Patent
Huang et al.

(10) Patent No.: US 8,018,336 B2
(45) Date of Patent: Sep. 13, 2011

(54) SYSTEM AND METHOD FOR RFID ASSET MONITOR

(75) Inventors: Shu-Ying Huang, Hsin Tien (TW); Li-Dar Pang, Hsin Tien (TW)

(73) Assignee: Champtek Incorporated, Taipei (TW)

( * ) Notice: Subject to any disclaimer, the term of this patent is extended or adjusted under 35 U.S.C. 154(b) by 588 days.

(21) Appl. No.: 12/185,265

(22) Filed: Aug. 4, 2008

(65) Prior Publication Data

US 2009/0231126 A1   Sep. 17, 2009

(30) Foreign Application Priority Data

Mar. 11, 2008  (TW) ................................ 97108490 A

(51) Int. Cl.
*G08B 1/08* (2006.01)
(52) U.S. Cl. ................................................. 340/539.13
(58) Field of Classification Search ............. 340/539.13, 340/572.1–572.9, 40.1, 825.36
See application file for complete search history.

(56) References Cited

U.S. PATENT DOCUMENTS

| | | | |
|---|---|---|---|
| 6,480,108 B2 * | 11/2002 | McDonald | 340/505 |
| 7,675,412 B2 * | 3/2010 | Adra | 340/539.13 |
| 2006/0012480 A1 * | 1/2006 | Klowak | 340/572.1 |
| 2008/0111690 A1 * | 5/2008 | Dupler et al. | 340/572.1 |
| 2009/0040048 A1 * | 2/2009 | Locker et al. | 340/572.1 |

* cited by examiner

*Primary Examiner* — Phung Nguyen
(74) *Attorney, Agent, or Firm* — Chun-Ming Shih; HDLS IPR Services

(57) ABSTRACT

A system for an asset monitor includes a reader, a tag, and a router. The router actively transmits a location identification to the tag in a coverage area by using a radio frequency (RF). The tag is mounted on an article (or a user). The tag directly sends a signal to the reader or indirectly forwards to the reader via the router when the location identification of the tag is different from a current location identification or the location identification is repeatedly received up to a preset value. The sent signal includes a location identification and a current location identification that are received by the reader to determine the location of the article.

18 Claims, 3 Drawing Sheets

SYSTEM AND METHOD FOR RFID ASSET MONITOR

BACKGROUND OF THE INVENTION

1. Field of the Invention

The present invention relates to an RFID monitor system, and more particularly to an asset monitor system.

2. Description of the Prior Art

Generally speaking, the radio frequency identification (RFID) applied to a zone location are divided into two groups. The first one is RFID reader location and the second one is IR (infrared rays) location.

In the RFID reader location, a plurality of RFID readers are installed in monitored spaces and radiated power of the RFID readers are set to adjust the coverage area. The RFID readers are connected to a rear terminal by a network, and the RFID readers receive a signal sent from a remote tag to acquire a location of the tag. However, the RFID reader location is unfavorable to apply in an accurate small-area location because of higher cost for using a large number of RFID readers.

In the IR location, a plurality of IR transmitters are installed in monitored spaces. The IR transmitter sends a location identification to an electronic tag with an IR receiver, and the electronic tag transmits a signal included the location identification to a reader. However, the location identification easily disappears when the IR receiver of the tag is covered by clothes or other objects.

ZigBee is a wireless technology developed as an open global standard to address the unique needs of low-cost, low-power, wireless sensor networks. However, ZigBee has two main disadvantages: first one is a large number of data are received by readers to increase electricity consumption of electronic tags. The second one is a plurality of routers are used to pass through responded messages to increase difficulty of certifying the actual location.

SUMMARY OF THE INVENTION

Accordingly, a primary object of the present invention is to provide a system and a method for a RFID asset monitor. A router is installed between a reader and a tag. The router can automatically sends a location identification to the tag, and afterward an original identification of the tag and the location identification of the router are sent to the reader, or indirectly forwarded via the router to acquire a location of the article.

In order to achieve the objective mentioned above, the asset monitor system comprises a tag, a reader, and a router. The tag is mounted on an article or a user. The reader is provided to receive a signal responded from the tag, and the router is installed in a desired place. The router automatically sends a location identification to the tag, and the location identification is received by the tag; the location identification is stored and directly sent to the reader or indirectly forwarded via the router.

In order to achieve the objective mentioned above, the asset monitor method comprises that a router transmits actively a location identification to a tag in a coverage area. Afterward, the tag receives the location identification in the coverage area, and determines whether the tag sends a signal or not. Afterward, the tag sends directly the signal to the reader or forwards indirectly to the reader via the router. The asset monitor system is a mesh network system, and the router can be provided to transmit a signal for another router; a signal received from the remote tag is transmitted to another nearby router, and the signal can be transmitted to another router near the reader and afterward the signal is transmitted to the reader by the router to acquire a location of the article (or the user).

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The above and further advantages of this invention may be better understood by referring to the following description, taken in conjunction with the accompanying drawings, in which.

Figure 1:
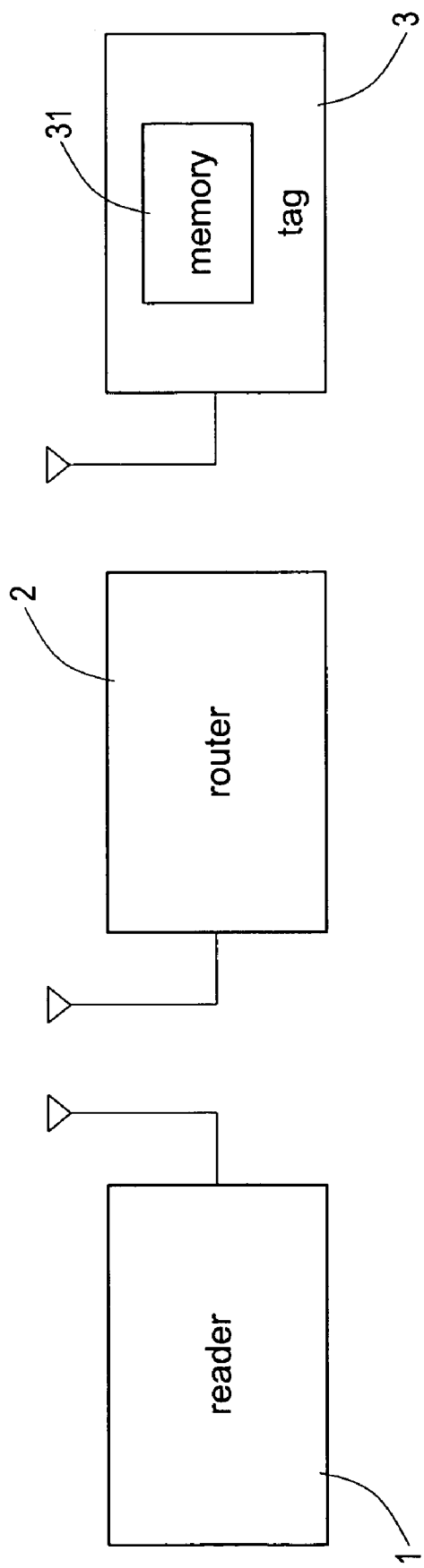
FIG. 1 is a block diagram of an asset monitor system according to the present invention.

The drawings will be described further in connection with the following detailed description of the present invention.

DETAILED DESCRIPTION OF THE INVENTION

Reference will now be made to the drawing figures to describe the present invention in detail.

Reference is made to FIG. 1 which is a block diagram of an asset monitor system according to the present invention. The asset monitor system comprises a reader 1, a router 2, and a tag 3. The asset monitor system is a mesh network system, and the router 2 is installed between the reader 1 and the tag 3. An original identification of the tag 3 and a location identification of the router 2 are sent to the reader 1, or indirectly forwarded via the router 2 to acquire a location of the article 5.

The reader 1 is a reader apparatus of a conventional radio frequency identification (RFID) and is provided to receive signal responded from the router 2 or the tag 3.

The router 2 automatically sends a location identification to the tag 3 in a coverage area. The router 2 can transmit the location identification to the tag 3 by using a time-setup way or externally triggering the router 2. A radiated power is set by the router 2 to adjust the coverage area where the location identification can be received by the tag 3.

The tag 3 is a tag apparatus of the conventional radio frequency identification (RFID) and is mounted on a user or an article 5. The tag 3 receives the location identification transmitted from the router 2 and the location identification is stored in a memory 31. The location identification and an original identification of the tag 3 are transmitted to the router 2, and afterward transmitted to the reader 1; or the location identification or the original identification are transmitted directly to the reader 1 to acquire a location of the tag 3. The tag 3 directly sends a signal to the reader 1 or indirectly forwards to the reader 1 via the router 2 when the location identification of the tag 3 is different from a current location identification or the location identification is repeatedly received up to a preset value.

Wherein, the signal can be sent by the Internet or an RS232, and afterward stored in a database of a host (not shown) to monitor the current location of the tag 3.

Figure 2:
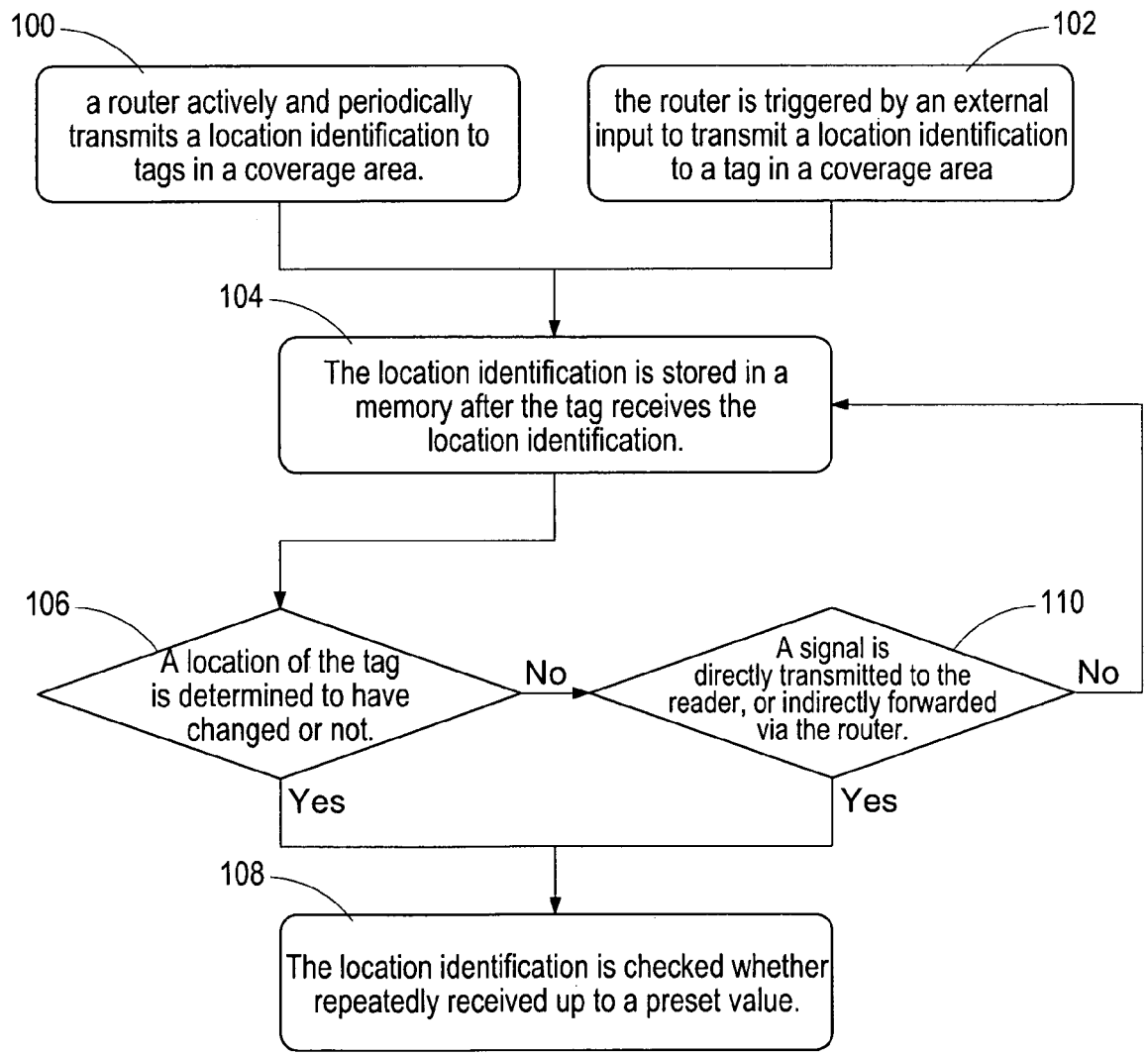
FIG. 2 is a flowchart of the asset monitor.

Reference is made to FIG. 2 which is a flowchart of the asset monitor. First, a router actively and periodically transmits a location identification to tags in a coverage area (S100), or the router is triggered by an external input to transmit a location identification to a tag in a coverage area (S102). The location identification is stored in a memory after the tag receives the location identification (S104). A location of the tag is determined to have changed or not (S106). A signal is directly transmitted to the reader, or indirectly forwarded via the router when the location is changed (S108). The signal includes an original identification and the location identification of the tag. The location identification is checked whether it is repeatedly received up to a preset value when the location is not changed (S110). The procedure returns to the step (S104) when the location identification is not repeatedly received. A signal is directly sent to the reader or indirectly forwarded via the router when the location identification is repeatedly received up to a preset value (S108).

Figure 3:
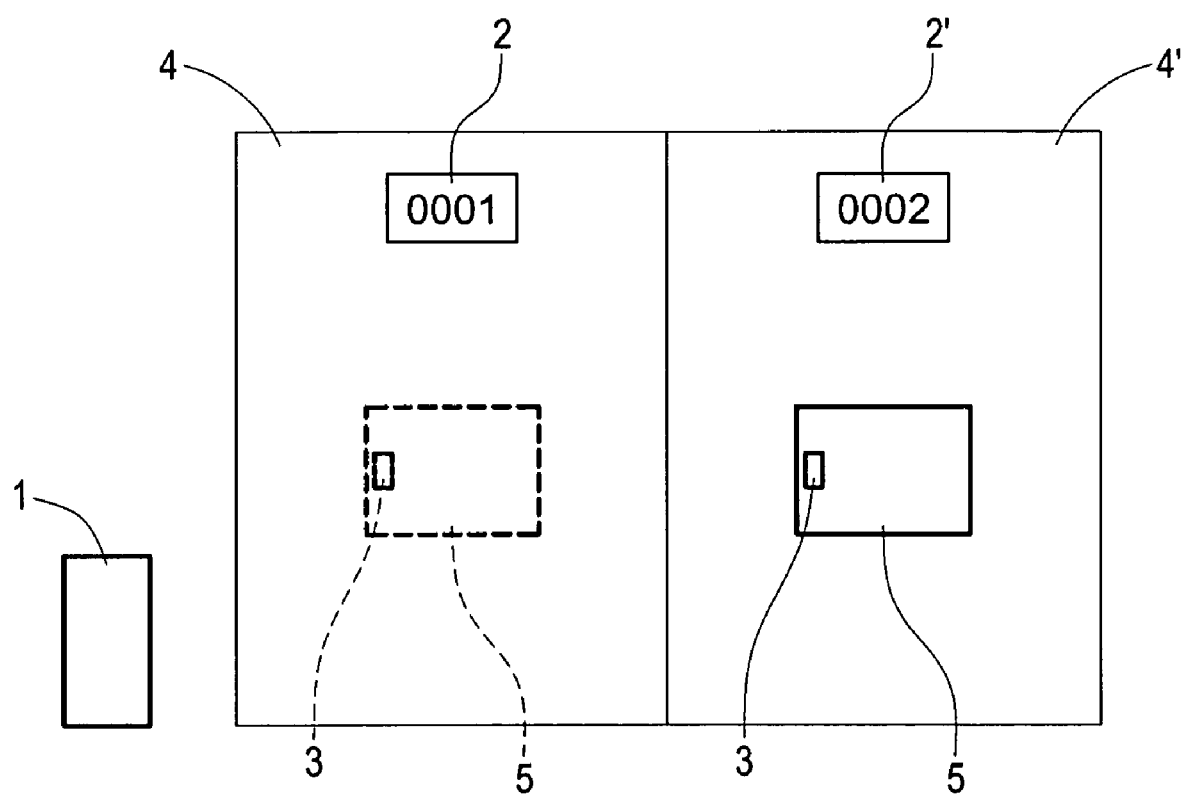
FIG. 3 is an application schematic view of the asset monitor.

Reference is made to FIG. 3 which is an application schematic view of the asset monitor. The two routers 2,2' are installed in two spaces 4,4', respectively, and the location identifications of the routers 2,2' are set as "0001" and "0002", respectively. The tag 3 is mounted on an article 5 (or a user), and it assumes that the location identification currently stored is set as "0000". The router 2 actively transmits the location identification set as "0002" to the tag 3 when the article 5 is placed in the space 4'. The new location identification set as "0002" is stored when the location identification set as "0002" is different from the current location identification set as "0000". Afterward, the tag 3 directly sends a signal to the reader 1 or indirectly forwarded via the router 2, 2'. The signal includes the location identification set as "0001" and the current location identification to acquire that the article 5 is placed in the space 4'.

The location identification is changed by the tag 3 when the article 5 is moved to the space 4. Afterward, the tag 3 directly sends a radio frequency (RF) signal to the reader 1 or indirectly forwards to the reader 1 via the router 2, 2'. An operator acquires that the article 5 is moved to the space 4 when the reader 1 receives the location identification set as "0001" and the current location identification.

What is claimed is:

1. A method for an asset monitor that a reader, a router, and a tag are provided to monitor an article or a user, the method comprising the steps of:
   transmitting actively a location identification to the tag in a coverage area by the router;
   receiving the location identification in the coverage area by the tag;
   determining whether a signal is sent or not by the tag; and
   forwarding indirectly the signal to the reader via the router to acquire a location of the article or the user
   wherein the asset monitor system is a mesh network system, and the router can be provided to transmit a signal for another router; a signal received from the remote tag is transmitted to another nearby router, and the signal can be transmitted to another router near the reader and afterward the signal is transmitted to the reader by the router to acquire a location of the article or the user.

2. The asset monitor method in claim 1, further comprising transmitting the location identification to the tag in the coverage area by externally triggering the router and transmitting the location identification to the tag in the coverage area by using a time-setup way by the router.

3. The asset monitor method in claim 1, wherein the location identification received by the tag is stored in a memory.

4. The asset monitor method in claim 1, wherein the router is one of a tag or a reader of a radio frequency identification (RFID).

5. The asset monitor method in claim 1, wherein the signal is automatically sent to the reader when the location is changed.

6. The asset monitor method in claim 1, wherein the signal is automatically sent to the reader when the location identification is repeatedly received up to a preset value.

7. The asset monitor method in claim 1, wherein the sent signal includes an original identification and the location identification of the tag.

8. The asset monitor method in claim 1, wherein the tag is a tag apparatus of a radio frequency identification (RFID).

9. The asset monitor method in claim 1, wherein the reader is a reader apparatus of a radio frequency identification (RFID).

10. An asset monitor system for monitoring a user or an article, comprising:
    a tag mounted on an article or a user;
    a reader provided to receive a signal responded from the tag; and
    a router installed in a desired place;
    wherein the router automatically sends a location identification to the tag, and the location identification is received by the tag; the location identification is stored and indirectly forwarded to the reader via the router
    wherein the asset monitor system is a mesh network system, and the router can be provided to transmit a signal for another router; a signal received from the remote tag is transmitted to another nearby router, and the signal can be transmitted to another router near the reader and afterward the signal is transmitted to the reader by the router to acquire a location of the article or the user.

11. The asset monitor system in claim 10, wherein the location identification is further transmitted to the tag in the coverage area by externally triggering the router and transmitted to the tag in the coverage area by using a time-setup way by the router.

12. The asset monitor system in claim 10, wherein the location identification received by the tag is stored in a memory.

13. The asset monitor system in claim 10, wherein the router is a tag apparatus of a radio frequency identification (RFID).

14. The asset monitor system in claim 10, wherein the tag actively sends a signal to the reader or indirectly forwards to the reader via the router when the location identification is changed.

15. The asset monitor system in claim 10, wherein the tag directly sends a signal to the reader or indirectly forwards to the reader via the router when the location identification is repeatedly received up to a preset value.

16. The asset monitor system in claim 10, wherein the sent signal includes an original identification and the location identification of the tag.

17. The asset monitor system in claim 10, wherein the tag is a tag apparatus of a radio frequency identification (RFID).

18. The asset monitor system in claim 10, wherein the reader is a reader apparatus of a radio frequency identification (RFID).

* * * * *